United States Patent
Lin

(10) Patent No.: US 10,623,682 B1
(45) Date of Patent: Apr. 14, 2020

(54) INTERACTIVE ANTENNA SYSTEM

(71) Applicant: TRANS ELECTRIC CO., LTD., Huatang, Changhua (TW)

(72) Inventor: Mao-Jung Lin, Changhua (TW)

(73) Assignee: TRANS ELECTRIC CO., LTD., Changhua (TW)

( * ) Notice: Subject to any disclaimer, the term of this patent is extended or adjusted under 35 U.S.C. 154(b) by 0 days.

(21) Appl. No.: 16/264,922

(22) Filed: Feb. 1, 2019

(30) Foreign Application Priority Data

Nov. 2, 2018 (TW) .............................. 107214959 U

(51) Int. Cl.
*H04N 5/50* (2006.01)
*H04N 17/04* (2006.01)
*H01Q 1/00* (2006.01)

(52) U.S. Cl.
CPC ............. *H04N 5/50* (2013.01); *H04N 17/045* (2013.01)

(58) Field of Classification Search
CPC ...... H04N 5/50; H04N 17/045; H04B 17/318; H01Q 15/066
See application file for complete search history.

(56) References Cited

U.S. PATENT DOCUMENTS

| | | | | |
|---|---|---|---|---|
| 6,389,070 B1 * | 5/2002 | Cugnini | ................. | H04N 5/211 348/569 |
| 6,952,565 B1 * | 10/2005 | Takeda | ..................... | H04B 1/40 333/124 |
| 7,508,458 B2 * | 3/2009 | Matsuo | .................. | H01Q 3/242 348/180 |
| 7,561,213 B2 * | 7/2009 | Okamoto | ................. | H01Q 1/22 343/876 |
| 7,679,687 B2 * | 3/2010 | Kaneko | ................ | H04N 5/4401 348/706 |
| 9,219,943 B2 * | 12/2015 | Pyo | ........................ | H04H 20/12 |
| 9,485,041 B1 * | 11/2016 | Huang | ................. | H04B 17/318 |
| 9,503,205 B1 * | 11/2016 | Huang | ................. | H04B 17/318 |
| 9,966,992 B2 * | 5/2018 | Secall | ...................... | H04B 1/18 |
| 10,333,572 B2 * | 6/2019 | Onaka | ...................... | H04B 1/04 |
| 2002/0051085 A1 * | 5/2002 | Lee | ......................... | H01Q 1/247 348/570 |
| 2003/0228857 A1 * | 12/2003 | Maeki | .................... | H01Q 1/246 455/278.1 |
| 2004/0036772 A1 * | 2/2004 | Pugel | .................... | H03G 3/3052 348/180 |
| 2004/0128689 A1 * | 7/2004 | Pugel | ..................... | H01Q 1/125 725/72 |
| 2005/0287968 A1 * | 12/2005 | Takagi | ................... | H04B 7/0814 455/179.1 |

(Continued)

*Primary Examiner* — Brian P Yenke
(74) *Attorney, Agent, or Firm* — Burris Law, PLLC

(57) ABSTRACT

An interactive antenna system includes an adjustable antenna device, an antenna control device and an operation device. The adjustable antenna device is for receiving a radio frequency signal wirelessly to generate an antenna signal. The antenna control device measures signal strength of the antenna signal to generate a strength signal, transmits the strength signal wirelessly to the operation device, and controls the adjustable antenna device based on a control signal. The operation device displays the signal strength of the antenna signal based on the strength signal, generates the control signal at least based on an operation performed thereon, and transmits the control signal wirelessly to the antenna control device.

13 Claims, 2 Drawing Sheets

(56) References Cited

U.S. PATENT DOCUMENTS

| | | | | |
|---|---|---|---|---|
| 2006/0003693 A1* | 1/2006 | Onomatsu | H01Q 3/24 | 455/3.02 |
| 2006/0010473 A1* | 1/2006 | Takagi | H04H 60/32 | 725/72 |
| 2006/0020987 A1* | 1/2006 | Onomatsu | H04N 5/4401 | 725/100 |
| 2006/0020996 A1* | 1/2006 | Takagi | H04N 21/42607 | 725/124 |
| 2006/0020997 A1* | 1/2006 | Onomatsu | H04N 5/4401 | 725/134 |
| 2006/0028586 A1* | 2/2006 | Onomatsu | H04N 5/4401 | 348/725 |
| 2006/0055831 A1* | 3/2006 | Onomatsu | H04N 5/4401 | 348/725 |
| 2006/0125708 A1* | 6/2006 | Narita | H04B 7/0608 | 343/818 |
| 2006/0139499 A1* | 6/2006 | Onomatsu | H04B 7/022 | 348/725 |
| 2006/0209217 A1* | 9/2006 | Onomatsu | H01Q 3/30 | 348/732 |
| 2016/0112070 A1* | 4/2016 | Ryu | H04B 17/318 | 455/77 |
| 2018/0332251 A1* | 11/2018 | Pena Placer | H04N 17/004 | |
| 2020/0036965 A1* | 1/2020 | Lee | H04N 21/443 | |

\* cited by examiner

INTERACTIVE ANTENNA SYSTEM

CROSS-REFERENCE TO RELATED APPLICATION

This application claims priority of Taiwanese Patent Application No. 107214959, filed on Nov. 2, 2018.

FIELD

The disclosure relates to an antenna system, and more particularly to an interactive antenna system.

BACKGROUND

During transmission of radio frequency (RF) signals of digital television broadcasting to a media playing device (e.g. a digital television set), the RF signals, in addition to be susceptible to be blocked by physical structures such as buildings or landform, are commonly hindered by multipath interference due to signal reflection from the physical structures. Therefore, in order to receive the RF signals with relatively great quality, an antenna used for receiving the RF signals is usually positioned outdoors at a relatively high place, or indoors by a window, and rotated to a proper direction. However, as the antenna may be far from the media playing device in this kind of setup, it becomes difficult to adjust the placement and the orientation of the antenna for the best possible outcome.

In order to perform the adjustment, two persons are needed: one person monitors video quality of the media playing device and guides the other person to adjust the antenna accordingly. However, this is inconvenient, time consuming, and requires two persons. Furthermore, the determination of the quality of the received RF signals is purely based off human subjective observation, lacking any objective standard for determining optimal placement and orientation of the antenna.

Another way to perform the adjustment is to adjust the antenna according to objective measurement result, which is obtained by using an instrument that can measure signal strength of the RF signals at a particular location. However, the measurement result of the signal strength is related to the RF signals received by the instrument, and thus, may still be different from the actual signal strength of the RF signals received by the antenna.

SUMMARY

Therefore, an object of the disclosure is to provide an interactive antenna system that can alleviate at least one drawback of the prior arts.

According to the disclosure, the interactive antenna system includes an adjustable antenna device, an antenna control device and an operation device.

The adjustable antenna device is for wirelessly receiving a radio frequency signal transmitted by a television station to generate an antenna signal.

The antenna control device includes a measurement module, a first communication module and a first control module. The measurement module is connected to the antenna device for receiving the antenna signal therefrom, and measures signal strength of the antenna signal to generate a measurement signal. The first control module is connected to the adjustable antenna device, the measurement module and the first communication module. The first control module is for receiving the measurement signal from the measurement module, generates a strength signal based on the measurement signal, and wirelessly transmits the strength signal via the first communication module. The first control module is for wirelessly receiving a control signal via the first communication module, and controls the adjustable antenna device based on the control signal to at least change a resonant frequency of the adjustable antenna device.

The operation device includes a second communication module, an input module, a display module and a second control module. The input module generates an operation signal based on an operation performed thereon. The second control module is connected to the second communication module, the input module and the display module. The second control module is for wirelessly receiving the strength signal via the second communication module, and controls, based on the strength signal, the display module to display the signal strength of the antenna signal. The second control module is for receiving the operation signal from the input module, generates the control signal at least based on the operation signal, and wirelessly transmits the control signal via the second communication module.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
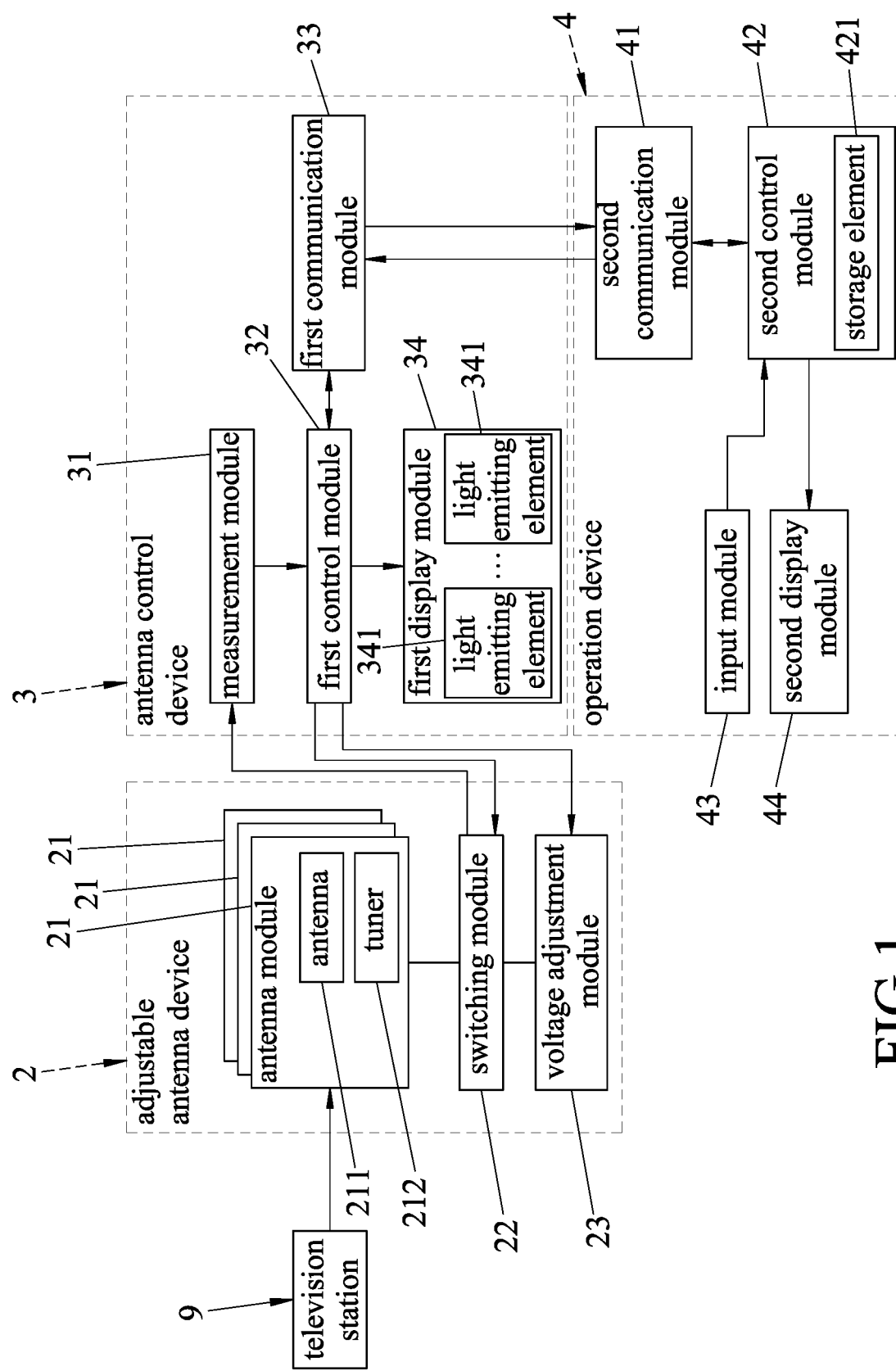
FIG. 1 is a block diagram illustrating an embodiment of an interactive antenna system according to the disclosure.
Figure 2:
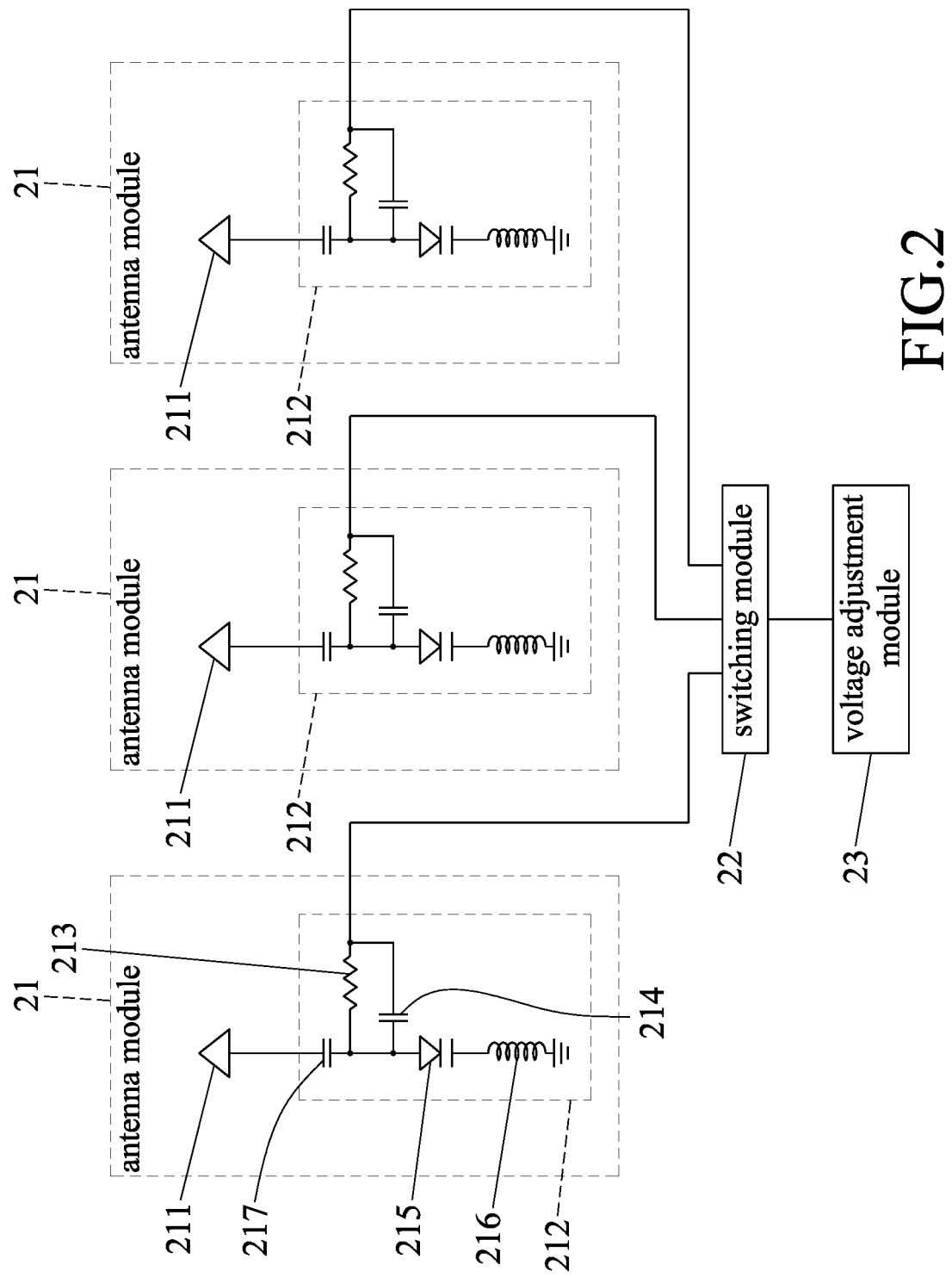
FIG. 2 is a circuit block diagram illustrating an adjustable antenna device of the embodiment.

Referring to FIGS. 1 and 2, an embodiment of an interactive antenna system according to the disclosure includes an adjustable antenna device 2, an antenna control device 3 and an operation device 4.

The adjustable antenna device 2 is for wirelessly receiving a radio frequency signal transmitted by a television station 9 to generate an antenna signal.

In this embodiment, the adjustable antenna device 2 includes a number (N) of antenna modules 21, a switching module 22 connected to the antenna modules 21, and a voltage adjustment module 23 connected to the switching module 22, where N≥2.

Each of the antenna modules 21 includes an antenna 211 and a tuner 212. The tuner 212 includes a variable capacitance element 215, a resistor 213, a first capacitor 214, an inductor 216 and a second capacitor 217. The variable capacitance element 215 (e.g., a variable capacitance diode) is to be voltage-controlled, and has a first terminal (e.g., an anode) and a second terminal (e.g., a cathode). The resistor 213 and the first capacitor 214 are connected in parallel between the first terminal of the variable capacitance element 215 and the switching module 22. The inductor 216 is connected between the second terminal of the variable capacitance element 215 and ground. The second capacitor 217 is connected between the antenna 211 and the first terminal of the variable capacitance element 215.

In an example, the antenna modules 21 are designed to be different from one another in at least one feature (e.g., frequency response).

The switching module 22 is operable to select and connect at least one of the antenna modules 21 to the voltage adjustment module 23.

For each of the at least one of the antenna modules 21, the voltage adjustment module 23 provides a respective control voltage to the antenna module 21 via the switching module 22, and is operable to adjust a magnitude of the respective control voltage so as to change a capacitance of the variable capacitance element 215 and thus an electrical length of the antenna module 21.

Therefore, by properly controlling the switching module 22 and the voltage adjustment module 23, a resonant frequency, a direction of greatest sensitivity and a gain of the adjustable antenna device 2 can be changed to meet application requirements.

The antenna control device 3 includes a measurement module 31, a first communication module 33, a first display module 34 and a first control module 32.

The switching module 22 is further connected to the measurement module 31, and is operable to further connect the at least one of the antenna modules 21 to the measurement module 31. The measurement module 31 is for receiving the antenna signal from the at least one of the antenna modules 21 via the switching module 22, and measures signal strength of the antenna signal to generate a measurement signal. In an example, the measurement signal has a voltage magnitude correlated to the signal strength of the antenna signal.

The first control module 32 is connected to the switching module 22, the voltage adjustment module 23, the measurement module 31, the first communication module 33 and the first display module 34. The first control module 32 is for receiving the measurement signal from the measurement module 31, generates a strength signal based on the measurement signal, wirelessly transmits the strength signal via the first communication module 33, and controls, based on the strength signal, the first display module 34 to display the signal strength of the antenna signal. The first control module 32 is for wirelessly receiving a control signal via the first communication module 33, and controls the switching module 22 and the voltage adjustment module 23 based on the control signal to change the resonant frequency, the direction of greatest sensitivity and the gain of the adjustable antenna device 2.

In this embodiment, the display module 34 includes a plurality of light emitting elements 341, and displays the signal strength of the antenna signal by emitting light from at least one of the light emitting elements 341. In an example, the light emitting elements 341 are of the same lighting color, and the display module 34 displays the signal strength of the antenna signal by a number of the at least one of the light emitting elements 341 that emits light. In another example, the light emitting elements 341 are of different lighting colors, and the display module 34 displays the signal strength of the antenna signal by color of the light emitted from the at least one of the light emitting elements 341.

The operation device 4 includes a second communication module 41, an input module 43, a second display module 44 and a second control module 42.

The input module 43 generates an operation signal based on an operation performed thereon.

The second control module 42 is connected to the second communication module 41, the input module 43 and the second display module 44, and includes a storage element 421. The second control module 42 is for wirelessly receiving the strength signal via the second communication module 41, is for receiving the operation signal from the input module 43, and is for receiving position and distance data of the television station 9 (relative to the adjustable antenna device 2). Based on the operation signal and on the position and distance data of the television station 9, the second control module 42 performs the following actions: (a) generating the control signal; and (b) obtaining setting of the adjustable antenna device 2 corresponding to the television station 9 (e.g., the selection of the switching module 22 and the magnitude (s) of the control voltage(s) provided by the voltage adjustment module 23). The second control module 42 further performs the following: (a) wirelessly transmitting the control signal via the second communication module 41; (b) storing the setting of the adjustable antenna device 2 corresponding to the television station 9 in the storage element 421; (c) controlling, based on the strength signal, the second display module 44 to display the signal strength of the antenna signal; (d) controlling the second display module 44 to display at least one of a minimal signal strength requirement corresponding to the television station 9 or an adjustment suggestion of the resonant frequency, the direction of greatest sensitivity and the gain of the adjustable antenna device 2; and (e) controlling the second display module 44 to display the setting of the adjustable antenna device 2 that is stored in the storage element 421 and that corresponds to the television station 9.

In this embodiment, the second communication module 41 communicates with the first communication module 33 using a low-power wireless communication technology (e.g., ZigBee, Bluetooth, Wi-Fi or the like). In addition, the operation device 4 is a handheld electronic device (e.g., a smart phone, a tablet or the like).

Operations of the interactive antenna system of this embodiment will be described in more detail below in a scenario where the operation device 4 is a smart phone, where a dedicated application is installed in the operation device 4, and where the dedicated application configures the second control module 42 to perform actions described below when executed by the second control module 42.

First, the second control module 42 downloads information of television channels that are viewable at a location of the adjustable antenna device 2, downloads the position and distance data of television stations (including the television station 9 and providing the aforesaid television channels) relative to the adjustable antenna device 2, and controls the second display module 44 to display the information of the aforesaid television channels, so a user can operate the input module 43 to select one of the aforesaid television channels (hereinafter referred to as the desired television channel). It is assumed that the desired television channel is provided by the television station 9. In response to the selection of the desired television channel, the second control module 42 obtains a target frequency value, a target direction and a target gain value based on the operation signal corresponding to the selection of the desired television channel and on the position and distance data of the television station 9, generates the control signal based on the target frequency value, the target direction and the target gain value, and wirelessly transmits the control signal to the first control module 32 via the first and second communication modules 33, 41. In response to the receipt of the control signal, the first control module 32 controls the adjustable antenna device 2 based on the control signal, such that the resonant frequency, the direction of greatest sensitivity and the gain of the adjustable antenna device 2 are respectively adjusted to the target frequency value, the target direction and the target gain value.

Thereafter, the first control module 32 generates the strength signal related to the signal strength of the antenna signal from the adjustable antenna device 2, wirelessly transmits the strength signal to the second control module 42 via the first and second communication module 33, 41, and controls the first display module 34 to display the signal strength of the antenna signal. In response to the receipt of the strength signal, the second control module 42 controls the second display module 44 to display the signal strength of the antenna signal by, for example, numerals, light or texts. In addition, the second control module 42 may further control the second display module 44 to display a minimal signal strength requirement of the desired television channel, and/or an adjustment suggestion of the resonant frequency, the direction of greatest sensitivity and the gain of the adjustable antenna device 2. For example, the second display module 44 may display texts such as "signal strength meets requirements", "signal strength should be greater than 40 dBm", "suggest increasing signal strength", "suggest increasing resonant frequency", etc.

Thereafter, if the user determines that the signal strength of the antenna signal needs further adjustment because, for example, the second display module 44 displays a suggestion of further adjustment of the signal strength, the user can operate the input module 43 to change the setting of the adjustable antenna device 2 until the user determines that the signal strength of the antenna signal does not need further adjustment.

Thereafter, the second control module 42 stores the setting of the adjustable antenna device 2 corresponding to the desired television channel. Thereafter, when the desired television channel is selected by the user again, the second control module 42 controls the second display module 44 to display the setting of the adjustable antenna device 2 that is stored in the storage element 421 and that corresponds to the desired television channel, so the user can use the aforesaid setting to adjust the adjustable antenna device 2.

It should be noted that, besides the adjustment of the adjustable antenna device 2 by the antenna control device 3 and the operation device 4 as described above, the user can manually change placement and orientation of the adjustable antenna device 2 to further enhance the signal strength of the antenna signal.

In view of the above, the interactive antenna system of this embodiment has the following advantages.

1. Since the antenna control device 3 directly measures the signal strength of the antenna signal from the adjustable antenna device 2, the measurement result is reliable.

2. Since the operation device 4 generates the control signal based on the operation performed thereon and wirelessly transmits the control signal, and since the antenna control device 3 wirelessly receives the control signal and controls the adjustable antenna device 2 based on the control signal, the user can remotely adjust the resonant frequency, the direction of greatest sensitivity and the gain of the adjustable antenna device 2, thereby preventing variation of the signal strength of the antenna signal due to proximity of the user to the adjustable antenna device 2.

3. Since the antenna control device 3 generates the strength signal related to the signal strength of the antenna signal and wirelessly transmits the strength signal, and since the operation device 4 wirelessly receives the strength signal and displays the signal strength of the antenna signal based on the strength signal, it is easy for the user to know the signal strength of the antenna signal and to determine whether to and/or how to adjust the resonant frequency, the direction of greatest sensitivity and the gain of the adjustable antenna device 2, which is convenient and time saving.

4. Since the antenna 211 of each of the antenna modules 21 includes the variable capacitance element 215, since the switching module 22 can select and connect at least one of the antenna modules 21 to the voltage adjustment module 23, and since the voltage adjustment module can adjust the magnitude(s) of the control voltage(s) provided to the at least one of the antenna modules 21 to change the capacitance (s) of the variable capacitance element (s) 215 of the at least one of the antenna modules 21, the resonant frequency, the direction of greatest sensitivity and the gain of the adjustable antenna device 2 can be adjusted.

5. Since the handheld electronic device (e.g., a widely used smart phone) already owned by the user can be used as the operation device 4, use of a dedicated device as the operation device 4 can be prevented, which is convenient and cost saving.

6. Since the operation device 4 can store the setting of the adjustable antenna device 2 corresponding to the desired television channel and can display the aforesaid setting stored thereby, the user can use the aforesaid setting to adjust the adjustable antenna device 2 when the desired television channel is selected thereby again, which is user friendly and time saving.

7. Since the operation device 4 can generate the control signal based on the operation signal corresponding to the selection of the desired television channel and on the position and distance data of the television station 9 relative to the adjustable antenna device 2, the signal strength of the antenna signal corresponding to the control signal thus generated can equal or approximate to its best value at the location of the adjustable antenna device 2, so no or only a few operations on the operation device 4 to adjust the adjustable antenna device 2 so as to achieve the best value of the signal strength of the antenna signal are needed, which is convenient and time saving.

It should be noted that, in another embodiment, the following modifications may be made to this embodiment: $N \geq 1$ (i.e., the total number of the antenna modules 21 is one or greater); the switching module 22 is omitted; the voltage adjustment module 23 is directly connected to the antenna modules 21; and for each of the antenna modules 21, the voltage adjustment module 23 provides a respective control voltage to the antenna module 21, and is controlled by the first control module 32 to adjust a magnitude of the respective control voltage so as to change an electrical length of the antenna module 21. In this case, actions of the antenna control device 3 and the operation device 4 related to the control on the switching module 22 are omitted; and when $N=1$, only the resonant frequency of the adjustable antenna device 2 can be adjusted.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that the disclosure is not limited to the disclosed embodiment but is intended to cover various arrangements included within the spirit and scope of the broadest interpretation so as to encompass all such modifications and equivalent arrangements.

What is claimed is:

1. An interactive antenna system comprising:
    an adjustable antenna device for wirelessly receiving a radio frequency signal transmitted by a television station to generate an antenna signal;
    an antenna control device including
        a signal strength meter connected to said adjustable antenna device for receiving the antenna signal therefrom, and measuring signal strength of the antenna signal to generate a measurement signal,
        a first transceiver, and
        a first controller connected to said adjustable antenna device, said signal strength meter and said first transceiver, said first controller being for receiving the measurement signal from said signal strength meter, generating a strength signal based on the measurement signal, and wirelessly transmitting the strength signal via said first transceiver, said first controller being for wirelessly receiving a control signal via said first transceiver, and controlling said adjustable antenna device based on the control signal to change a resonant frequency of said adjustable antenna device; and
    an operation device including
        a second transceiver,
        an input interface generating an operation signal based on an operation performed thereon,
        a display, and
        a second controller connected to said second transceiver, said input interface and said display, said second controller being for wirelessly receiving the strength signal via said second transceiver, and controlling, based on the strength signal, said display to display the signal strength of the antenna signal, said second controller being for receiving the operation signal from said input interface, generating the control signal based on the operation signal, and wirelessly transmitting the control signal via said second transceiver.

2. The interactive antenna system of claim 1, wherein said first controller controls said adjustable antenna device based on the control signal to further change a direction of greatest sensitivity of said adjustable antenna device.

3. The interactive antenna system of claim 1, wherein:
    said adjustable antenna device includes a number (N) of antenna modules, and a voltage adjustment module connected to said antenna modules, where N≥1; and
    for each of said antenna modules, said voltage adjustment module provides a respective control voltage to said antenna module, and is operable to adjust a magnitude of the respective control voltage so as to change an electrical length of said antenna module.

4. The interactive antenna system of claim 1, wherein:
    said adjustable antenna device includes a number (N) of antenna modules, a switch module connected to said antenna modules, and a voltage adjustment module connected to said switch module, where N≥2;
    said switch module is operable to select and connect at least one of said antenna modules to said voltage adjustment module; and
    for each of said at least one of said antenna modules, said voltage adjustment module provides a respective control voltage to said antenna module via said switch module, and is operable to adjust a magnitude of the respective control voltage so as to change an electrical length of said antenna module.

5. The interactive antenna system of claim 4, wherein each of said antenna modules includes:
    an antenna; and
    a tuner connected to said antenna and said switch module, and including a variable capacitance element to be voltage-controlled.

6. The interactive antenna system of claim 5, wherein said variable capacitance element of each of said antenna modules is a variable capacitance diode.

7. The interactive antenna system of claim 5, wherein for each of said antenna modules, said variable capacitance element has a first terminal and a second terminal, and said tuner further includes:
    a resistor and a first capacitor connected in parallel between said first terminal of said variable capacitance element and said switch module;
    an inductor connected between said second terminal of said variable capacitance element and ground; and
    a second capacitor connected between said antenna and said first terminal of said variable capacitance element.

8. The interactive antenna system of claim 1, wherein said operation device is a handheld electronic device.

9. The interactive antenna system of claim 1, wherein said first and second transceivers communicate with each other using one of ZigBee, Bluetooth and Wi-Fi.

10. The interactive antenna system of claim 1, wherein said antenna control device further includes a display that is connected to said first controller, that includes a plurality of light emitting elements, and that is controlled by said first controller based on the strength signal to display the signal strength of the antenna signal by emitting light from at least one of said light emitting elements.

11. The interactive antenna system of claim 1, wherein said second controller generates the control signal further based on position and distance data of the television station relative to said adjustable antenna device.

12. The interactive antenna system of claim 1, wherein said second controller further controls said display to display at least one of a minimal signal strength requirement corresponding to the television station or an adjustment suggestion of the resonant frequency of said adjustable antenna device.

13. The interactive antenna system of claim 1, wherein said second controller includes a storage element, stores setting of said adjustable antenna device corresponding to the television station in said storage element, and controls said display to display the setting of said adjustable antenna device that is stored in said storage element and that corresponds to the television station.

* * * * *